United States Patent
Liu et al.

(10) Patent No.: US 10,652,284 B2
(45) Date of Patent: May 12, 2020

(54) METHOD AND APPARATUS FOR SESSION CONTROL SUPPORT FOR FIELD OF VIEW VIRTUAL REALITY STREAMING

(71) Applicant: Samsung Electronics Co., Ltd., Suwon-si (KR)

(72) Inventors: Chenghao Liu, Frisco, TX (US); Imed Bouazizi, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 15/729,101

(22) Filed: Oct. 10, 2017

(65) Prior Publication Data

US 2018/0103072 A1 Apr. 12, 2018

Related U.S. Application Data

(60) Provisional application No. 62/407,293, filed on Oct. 12, 2016, provisional application No. 62/444,675, filed on Jan. 10, 2017.

(51) Int. Cl.
*H04L 12/00* (2006.01)
*H04L 29/06* (2006.01)
*H04L 29/08* (2006.01)

(52) U.S. Cl.
CPC ...... *H04L 65/1059* (2013.01); *H04L 65/4069* (2013.01); *H04L 65/4084* (2013.01); *H04L 65/4092* (2013.01); *H04L 65/602* (2013.01); *H04L 67/303* (2013.01); *H04L 67/38* (2013.01)

(58) Field of Classification Search
CPC .......... H04L 65/1059; H04L 65/4069; H04L 65/602; H04L 67/38; H04L 65/4084; H04L 67/303
USPC ........................................................ 709/219
See application file for complete search history.

(56) References Cited

U.S. PATENT DOCUMENTS

| | | | | |
|---|---|---|---|---|
| 7,143,432 | B1 * | 11/2006 | Brooks .......... | H04N 21/234363 725/105 |
| 7,480,727 | B2 * | 1/2009 | Domschitz ............. | A63F 13/12 709/231 |
| 8,019,815 | B2 * | 9/2011 | Keener, Jr. .............. | H04N 7/15 709/204 |
| 8,250,616 | B2 * | 8/2012 | Davis ................. | H04N 7/17318 725/87 |
| 8,887,202 | B2 * | 11/2014 | Hunter ............... | H04N 5/44543 725/48 |
| 9,066,048 | B2 * | 6/2015 | Hoffert .............. | H04N 5/44591 |
| 9,778,819 | B2 * | 10/2017 | Petterson ............. | G06F 3/0482 |

(Continued)

OTHER PUBLICATIONS

International Search Report and Written Opinion regarding International Application No. PCT/KR2017/011244, dated Jan. 23, 2018, 15 pages.

(Continued)

*Primary Examiner* — Frantz Coby

(57) ABSTRACT

A server for streaming content includes a communication interface and a processor. The communication interface is configured to communicate with a user equipment (UE). The processor is configured to determine whether the UE supports viewing direction feedback. When the UE supports viewing direction feedback, the processor generates a first portion of the content corresponding to a first field of view of the UE and transmits the first portion of the content to the UE.

20 Claims, 13 Drawing Sheets

(56) References Cited

U.S. PATENT DOCUMENTS

| | | | | |
|---|---|---|---|---|
| 10,089,774 B2* | 10/2018 | Kallio | ............ | G06T 15/005 |
| 10,127,287 B1* | 11/2018 | Evans | ............ | G06F 3/0484 |
| 10,171,254 B2* | 1/2019 | Davis | ............ | G06Q 10/00 |
| 2006/0150224 A1* | 7/2006 | Kamariotis | ...... | H04N 21/21805 725/89 |
| 2010/0259595 A1* | 10/2010 | Trimeche | ......... | H04N 21/21805 348/43 |
| 2012/0320169 A1 | 12/2012 | Bathiche | | |
| 2014/0368736 A1* | 12/2014 | Hoffert | ............ | H04N 5/44591 348/564 |
| 2014/0368737 A1* | 12/2014 | Hoffert | ............ | H04N 5/44591 348/564 |
| 2015/0026739 A1 | 1/2015 | Kitazato | | |
| 2015/0346812 A1 | 12/2015 | Cole et al. | | |
| 2016/0025981 A1 | 1/2016 | Bums et al. | | |
| 2016/0165309 A1 | 6/2016 | Van Brandenburg et al. | | |
| 2016/0209658 A1 | 7/2016 | Zalewski | | |

OTHER PUBLICATIONS

Alface, P., et al., "Interactive Omnidirectional Video Delivery: A Bandwidth-Effective Approach," Bell Labs Technical Journal, vol. 16, No. 4, 2012, pp. 135-148.

Lee, J., et al., "Revised Text of ISO/IEC 23008-1:201x PDAM 2 MMT Enhancements for Mobile Environments," ISO/IEC JTC1/SC29/WG11, MPEG/w16196, Systems, Geneve, Switzerland, Jul. 2016, 43 pages.

Supplementary European Search Report dated Aug. 16, 2019 in connection with European Patent Application No. 17 86 0414, 8 pages.

European Patent Office Communication pursuant to Article 94(3) EPC regarding Application No. 17860414.6, dated Jan. 24, 2020, 6 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V|D| CMD_CODE|  EXT_LENGTH  |         ...                     |
+-+-+-+-+-+-+-+-+-+-+-+-+-+-+-+-+                               |
|        Extension (JSON encoded parameters+padding)            |
+-+-+-+-+-+-+-+-+-+-+-+-+-+-+-+-+-+-+-+-+-+-+-+-+-+-+-+-+-+-+-+-+
|                   Application Data            |
|                        ...                    |
+-+-+-+-+-+-+-+-+-+-+-+-+-+-+-+-+-+-+-+-+-+-+-+-+-+-+-+-+-+-+-+-+
```

FIGURE 6

METHOD AND APPARATUS FOR SESSION CONTROL SUPPORT FOR FIELD OF VIEW VIRTUAL REALITY STREAMING

CROSS-REFERENCE TO RELATED APPLICATION AND CLAIM OF PRIORITY

This application claims priority under 35 U.S.C. § 119(e) to U.S. Provisional Patent Application No. 62/407,293 filed on Oct. 12, 2016 and U.S. Provisional Patent Application No. 62/444,675 filed on Jan. 10, 2017. The above-identified provisional patent applications are hereby incorporated by reference in their entirety.

TECHNICAL FIELD

This disclosure relates generally to the MPEG media transport (MMT) Virtual Reality (VR) streaming. Specifically, this disclosure is directed to devices and methods for supporting the delivery of Field of View (FOV) streaming in MMT.

BACKGROUND

Virtual reality experiences are becoming prominent. For example, 360° video is emerging as a new way of experiencing immersive video due to the ready availability of powerful handheld devices such as smartphones. 360° video enables immersive "real life", "being there" experience for consumers by capturing the 360° degree view of the world. Users can interactively change their viewpoint and dynamically view any part of the captured scene they desire. Display and navigation sensors track head movement in real-time to determine the region of the 360° video that the user wants to view.

In streaming of 360° video content, such 360° video content typically consumes high volumes of bandwidth as it contains multi-directional video contents to provide an immersive user experience. Moreover, only certain FOV video content will be rendered at a certain time instantly typically by deploying a graphics library. Taking the features of the 360° video into account, there is a need for reducing bandwidths for appropriately sending the partition of video or tile according to the viewing direction where a user is viewing.

SUMMARY

The present disclosure relates to devices and methods for supporting the delivery of Field of View (FOV) streaming in MMT.

In a first embodiment, a server for streaming content includes a communication interface and a processor. The communication interface is configured to communicate with a user equipment (UE). The processor is configured to determine whether the UE supports viewing direction feedback. When the UE supports viewing direction feedback, the processor generates a first portion of the content corresponding to a first field of view of the UE and transmits the first portion of the content to the UE.

In a second embodiment, a method performed by a server for streaming content includes determining whether a user equipment (UE) supports viewing direction feedback. When the UE supports viewing direction feedback, the method also includes generating a first portion of the content corresponding to a first field of view of the UE. The first portion of the content is then transmitted to the UE.

In a third embodiment, a user equipment (UE) for rendering content includes a communication interface, a sensor, and a processor. The communication interface is configured to receive the content from a server. The sensor is configured to determine a change in a direction of the UE. The processor is coupled to the communication interface and the sensor and is configured to determine an indication where the indication is configured to provide a starting point for new content. The processor also controls the communication interface to transmit the direction of the UE and the indication to the server and receives at least one tile of the new content based on the direction of the UE and the indication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 6 illustrates an example frame structure according to this disclosure;

DETAILED DESCRIPTION

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Figure 1:
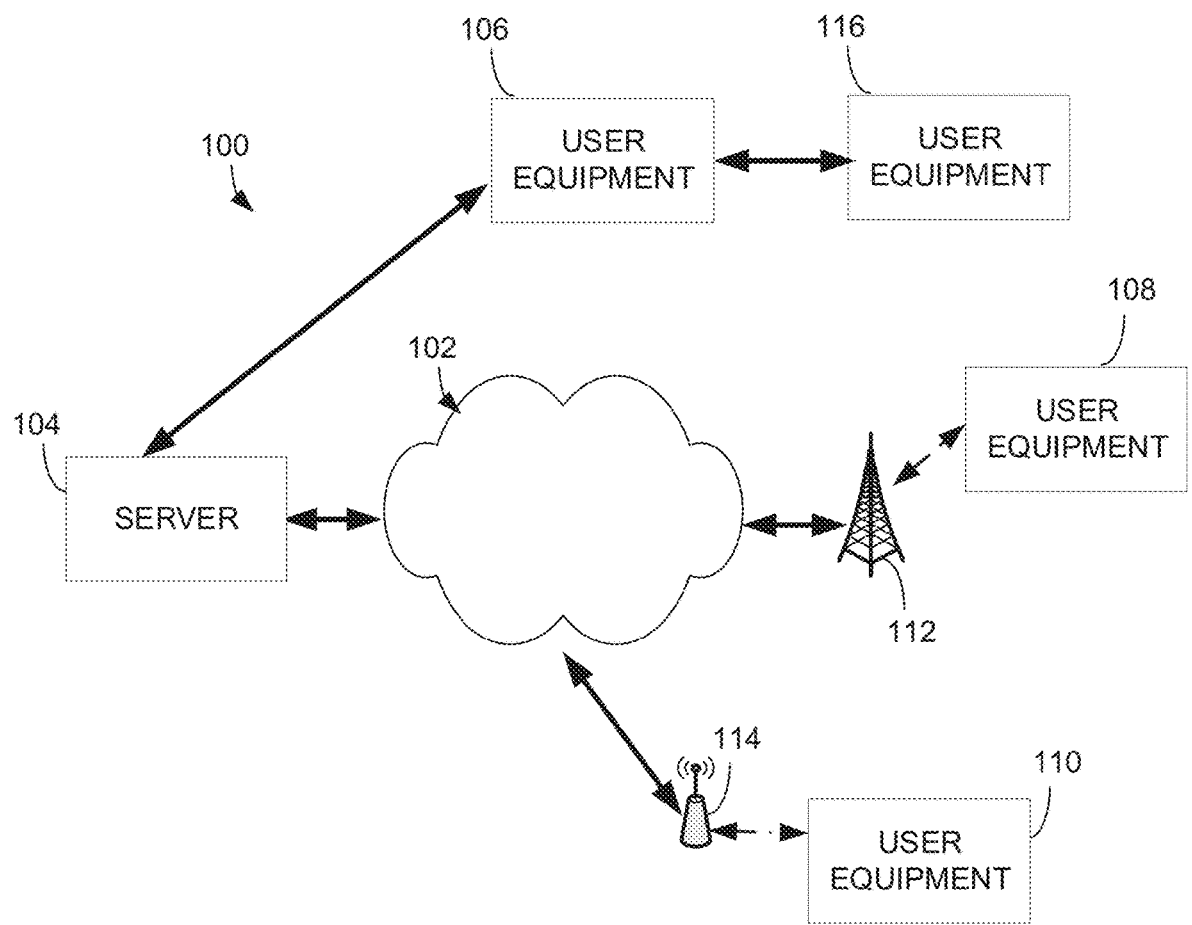
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between the server 104 and various UEs 106-110. The UEs 106-110 may be, for example, a smartphone, tablet, laptop, personal computer, a wearable device, or head-mounted display (HMD). The server 104 includes any suitable computing or processing device that can provide computing services for one or more client devices. Each server 104 could, for example, include one or more processing devices, one or more memories storing instructions and data, and one or more network interfaces facilitating communication over the network 102.

In this example, the UE 106 can communicate directly with the server 104 using WI-FI®, BLUETOOTH®, or any short range communication protocols. Some UEs 108 and 110 communicate indirectly with the network 102. For example, the UE 108 communicates via one or more base stations 112, such as cellular base stations or eNodeBs. Also, the UE 110 communicates via one or more wireless access points 114, such as IEEE 802.11 wireless access points. Note that these are for illustration only and that each client device could communicate directly with the network 102 or indirectly with the network 102 via any suitable intermediate device(s) or network(s).

As described in more detail below, the server 104 provides virtual reality content to one or more users. The virtual reality content may include a high resolution first region that includes a field of view for the UE and low resolution second region corresponding to the remaining portion of the virtual reality content outside the field of view.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
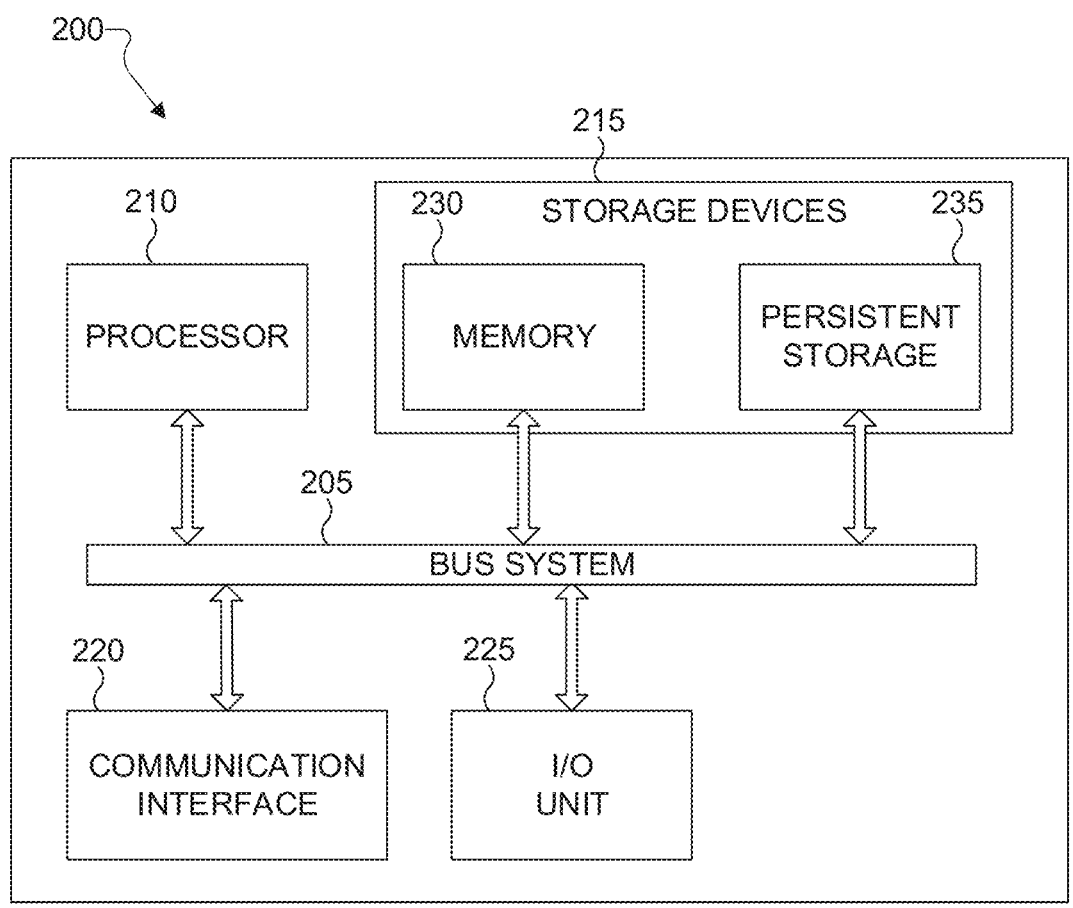
FIG. 2 illustrates an example server in a computing system according to this disclosure.
Figure 3:
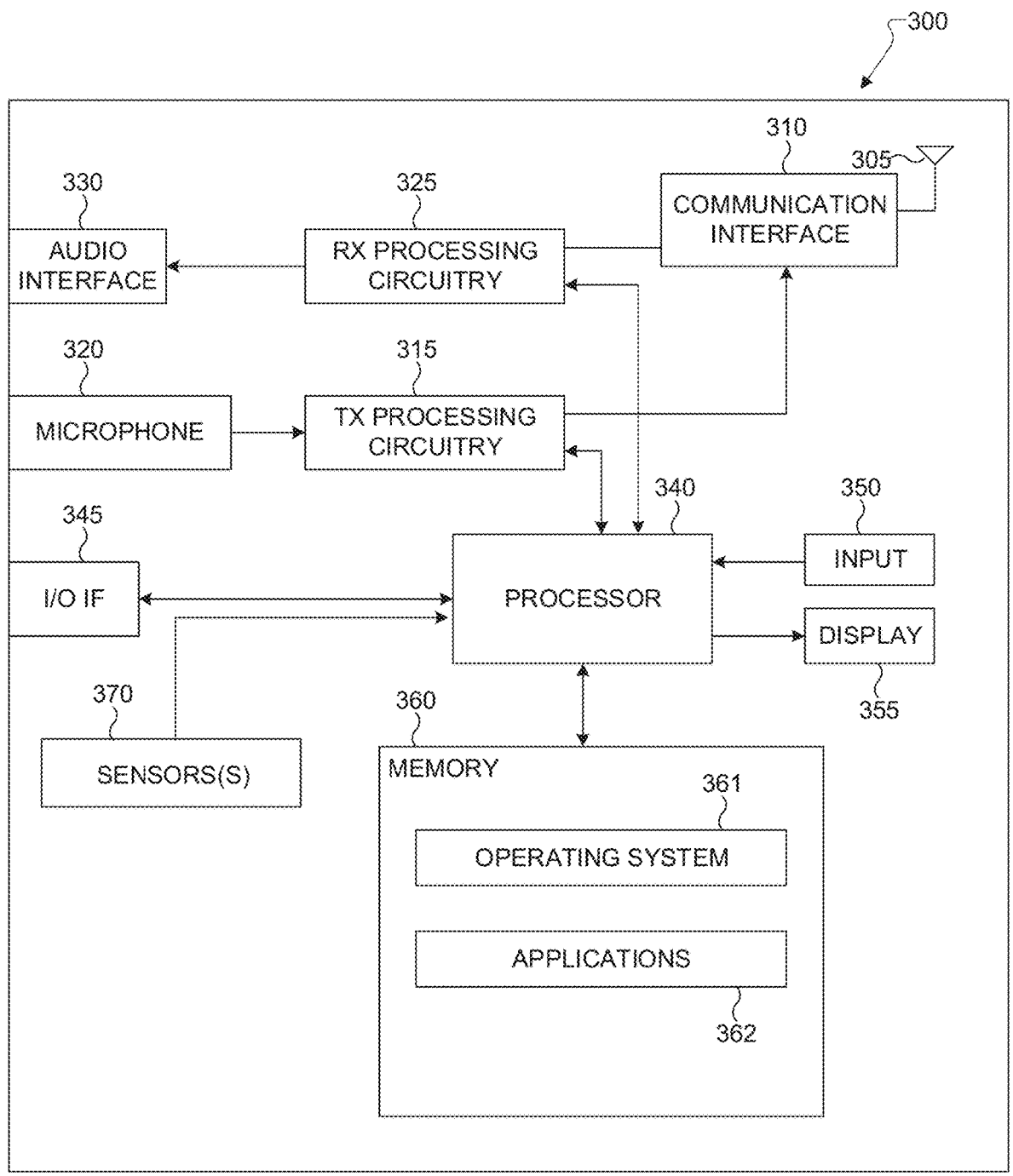
FIG. 3 illustrates an example user equipment (UE) according to this disclosure.

FIGS. 2 and 3 illustrate example devices in a computing system according to this disclosure. In particular, FIG. 2 illustrates an example server 200, and FIG. 3 illustrates an example UE 300. The server 200 could represent the server 104 in FIG. 1, and the UE 300 could represent the UEs 106-110 in FIG. 1.

As shown in FIG. 2, the server 200 includes a bus system 205, which supports communication between at least one processor 210, at least one storage device 215, and at least one communications unit 220.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. Memory 230 stores an application thereon that is used to control one or more functions of the server 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the server 200 may include an I/O unit 225 that allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a server 200, various changes may be made to FIG. 2. For example, the server 200 could include any number of each component shown in FIG. 2.

Figure 4:
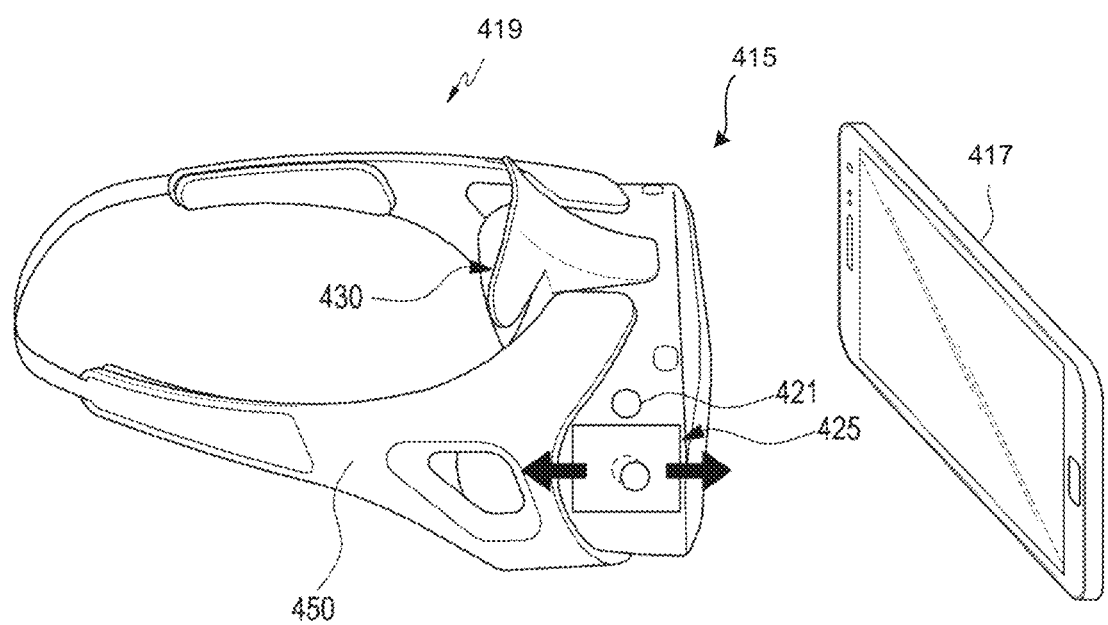
FIG. 4 illustrates a perspective view of a head-mounted display (HMD) according to this disclosure.

FIG. 3 illustrates an example UE 300 according to this disclosure. The embodiment of the UE 300 illustrated in FIG. 3 is for illustration only, and the UEs 106-110 of FIG. 1 could have the same or similar configuration. However, UEs come in a wide variety of configurations, and FIG. 3 does not limit the scope of this disclosure to any particular implementation of an UE. In one or more embodiments of this disclosure, the UE 300 may be replaced by a HMD as shown in FIG. 4.

As shown in FIG. 3, the UE 300 includes a communication interface 310. The communication interface 310 may include, for example, a RF transceiver, a Bluetooth transceiver, or a WiFi transceiver. The UE 300 may also include transmit (TX) processing circuitry 315, a microphone 320, and receive (RX) processing circuitry 325. The UE 300 also includes an audio interface or speaker 330, a processor 340, an input/output (I/O) interface (IF) 345, an input 350, a display 355, and a memory 360. The memory 360 includes an operating system (OS) program 361 and one or more applications 362.

The communication interface 310 may receive an incoming RF signal such as, e.g., a BLUETOOTH® signal or a WI-FI® signal. The "communication interface 310" may down convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication interface 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the UE 300. For example, the processor 340 could control the reception of forward channel signals and the transmission of reverse channel signals by the communication interface 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 300 with the ability to connect to other devices such as laptop computers and handheld computers. The I/O interface 345 is the communication path between these accessories and the processor 340.

The processor 340 is also coupled to the input 350 and the display 355. The operator of the UE 300 can use the input 350 (e.g., keypad, touchscreen, button etc.) to enter data into the UE 300. The display 355 may be a liquid crystal display, a light-emitting diode (LED) display, an optical LED (OLED), an active matrix OLED (AMOLED), a transparent or opaque display such one or more lenses on a pair of augmented reality glasses where one or more images maybe projected onto or displayed using the lens, or other display capable of rendering text and/or at least limited graphics, such as from web sites. In one embodiment, the input 350 is a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the processor 340. Part of the memory 360 could include a random access memory (RAM), and another part of the memory 360 could include a Flash memory or other read-only memory (ROM).

UE 300 may further include one or more sensors 370 that can meter a physical quantity or detect an activation state of the UE 300 and convert metered or detected information into an electrical signal. For example, sensor 370 may include one or more buttons for touch input, e.g., on the headset or the UE 300, one or more cameras 380, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the UE 300, within a headset configured to hold the UE 300, or in both the headset and UE 300, for example, in embodiments where the UE 300 includes a headset.

Although FIG. 3 illustrates one example of UE 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

FIG. 4 illustrates one example of a head mounted device (HMD) that may be used with various embodiments of the present disclosure. As shown in FIG. 4, an HMD 415 may include an UE 417 and an UE 419 according to an embodiment of the present disclosure. HMD 415 illustrates one example of an UE 300 that may be used with the embodiments of the present disclosure.

The UE 417 may include a display that displays 360° video received from a server, for example, server 104 of FIG. 1.

The UE 417 may store a virtual reality application. For example, the UE 417 may be the UE 300 and include all the features of the UE 300 such as sensors 370 and internally and externally facing cameras 380. The virtual reality application may be an application which can provide a display similar to an actual reality to the user. According to an embodiment, the virtual reality application may display a left eye image and a right eye image corresponding to each of the user's eyes based on a stereo scheme.

The UE 419 according to an embodiment may include a housing 450 provided to be worn on the user's head, a blackout part 430 fixed to the housing and provided at an area corresponding to locations of the user's eyes, and at least one input button 421 provided at one area of the housing 450. The input button 421 may be used to capture a viewport that a user desires to share. The UE 402 may include an input pad 425 which may receive an input from the user such as a swipe, tap, or other input performed by a user.

In operation, when a user activates or actuates input button 421, sensors 370 determine the center pitch and center yaw of the viewport. The HMD 415 may then provide the center pitch and center yaw to a server, such as server 104 of FIG. 1. The server then adds the center pitch and center yaw to the metadata of the associated frame or series of frames in the video along with a user ID to identify the user that is sharing the particular viewport. In other embodiments, the HMD 415 may store the center pitch and center yaw for each frame as the user watches the 360° video and store it in the memory 360 with the corresponding frame ID and user ID. Upon activation of the input button 421, the HMD 415 transmits the stored center pitch, center yaw, frame ID, and user ID to a server to share the user's viewport with other users.

The blackout part 430 provides a seal against external light from entering the space between a user's eyes and the UE 417. Thus, the user may position the user's eyes to fit closely to the blackout part 430 and, accordingly, the user may view the image by the virtual reality application provided from the UE 401 without any interference from external light.

The UE 417 may be coupled to the UE 419. The UE 417 may be connected to the UE 419 through a wire or wirelessly. For example, although the UE 401 may be connected to the UE 419 based on a USB connection. The aforementioned is merely an example and it may be easily understood by those skilled in the art that there is no limitation on the connection if data transmission/reception between the two UEs 417 and 419 is possible through the connection. According to another embodiment, the UE 417 may be directly coupled to the UE 419 without the use of a wire or wireless connection.

In the embodiments described herein with regard to FIGS. 5 through 10, for MPEG media transport (MMT) field of view (FOV) streaming, consecutive interactions between a streaming client, such as UE 300 of FIG. 3, and a server, such as server 200 of FIG. 2, may be needed in order to send the appropriate tiled virtual reality (VR) content according to viewing direction changes of a user and rendering the pixels of the tiled VR texture(s), appropriately. In MMT FOV streaming, the streaming server typically needs to send appropriate video tiles according to where the client's field of view as the MMT streaming typically operates as a server-driven streaming. Thus, MMT FOV streaming may provide bandwidth efficient VR streaming.

In order to support MMT FOV streaming, client viewing direction feedback from the UE to the server and notification of sending new tiles from the server to the client may be necessary. The UE's viewing direction feedback includes enough information for the server to specify the appropriate tile(s) which cover the UE's FOV as the UE changes the viewing direction. Upon receiving the feedback the server checks whether or not to send new 260° video or MMT assets which include different regions of tiles. The notification of sending new tile MMT assets from the server to the UE includes enough information for the UE to select appropriate MMT packets in the MMT asset to playback and render for the tile textures. Upon receiving the notification of new tiles being transmitted by the server, the UE determines the count of active tile textures and its asset IDs, and passes the parameters of active asset IDs and its tile textures in an identical order to a fragment shader (which may be incorporated into processor 340) so that the fragment shader can identify which tile textures are inactive and render appropriately based on the notification signaling from the server. Such signaling may be executed consecutively between the streaming UE and server during a MMT FOV delivery process.

In order to setup an MMT session in the initialization, the server queries whether the UE client supports signaling method described herein. If the UE does not support the signaling, the UE replies with a non-supporting message and the server will operates as regular MMT VR streaming without using FOV VR upon receiving the message. Otherwise, if the UE supports the signaling, the UE replies with a supporting message and the server will process the MMT FOV VR streaming upon receiving the message.

Figure 5:
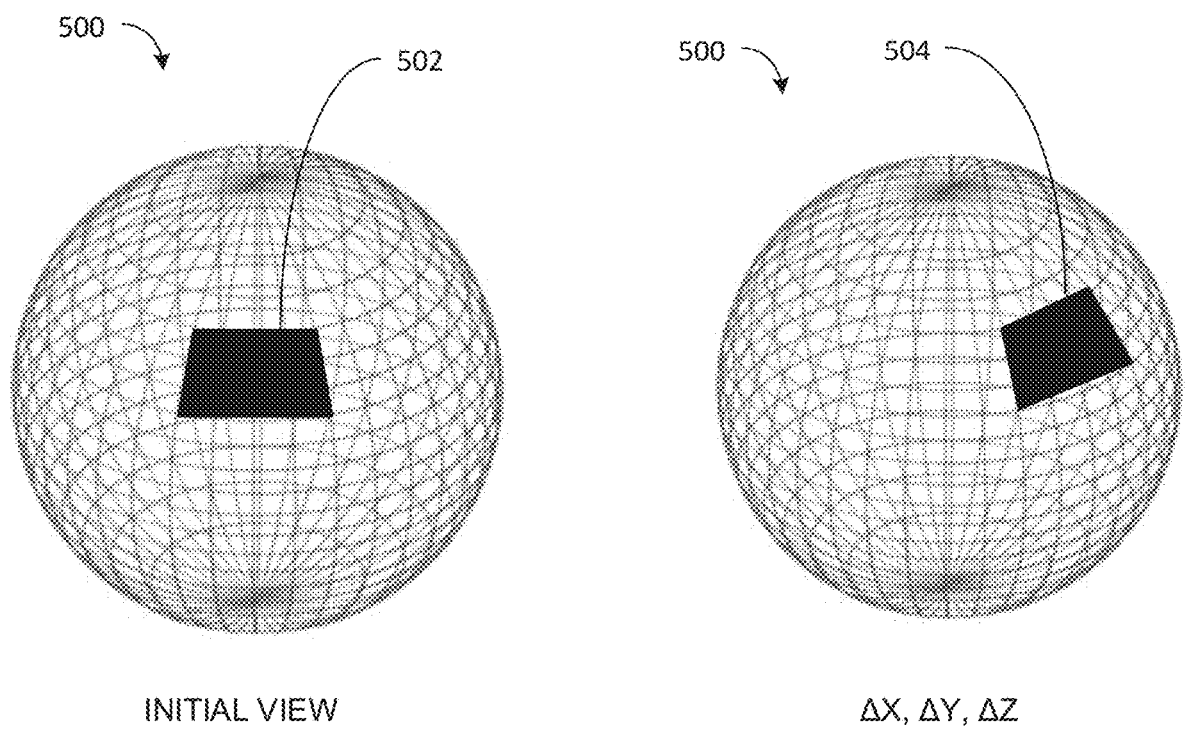
FIG. 5 illustrates example virtual reality environments according to this disclosure.

FIG. 5 illustrates example field of views according to this disclosure. As show in FIG. 5, when a user first views a 3D virtual environment 500 of a virtual reality content', using, for example, HMD 415 of FIG. 4, the user is presented with an initial field of view (FOV) 502. The initial FOV 502 may be stored with the virtual reality content or stored separately in a memory of the server. When a user moves so that the HMD 415 is in a different direction, a new FOV 504 is presented to the user based on the movement of the HMD 415 in the x, y, and z directions.

When the user moves the HMD 415, the virtual camera direction may be obtained from the device orientation. The device orientation may be represented using alpha, beta, and gamma using transformation from a coordinate frame fixed on the earth to a coordinate frame fixed in the device. The earth coordinate frame may be an 'east, north, and up' frame at the user's location. The device orientation data could be obtained from the HMD 415. A quaternion may be used to represent the device orientation which can be obtained from a Euler angle as shown Eq. 1.

$$q = \begin{bmatrix} q_w \\ q_x \\ q_y \\ q_z \end{bmatrix} = \begin{bmatrix} \cos\left(\frac{\beta}{2}\right)\cos\left(\frac{\gamma}{2}\right)\cos\left(\frac{\alpha}{2}\right) - \sin\left(\frac{\beta}{2}\right)\sin\left(\frac{\gamma}{2}\right)\sin\left(\frac{\alpha}{2}\right) \\ \sin\left(\frac{\beta}{2}\right)\sin\left(\frac{\gamma}{2}\right)\cos\left(\frac{\alpha}{2}\right) - \cos\left(\frac{\beta}{2}\right)\sin\left(\frac{\gamma}{2}\right)\sin\left(\frac{\alpha}{2}\right) \\ \cos\left(\frac{\beta}{2}\right)\sin\left(\frac{\gamma}{2}\right)\cos\left(\frac{\alpha}{2}\right) + \sin\left(\frac{\beta}{2}\right)\sin\left(\frac{\gamma}{2}\right)\sin\left(\frac{\alpha}{2}\right) \\ \cos\left(\frac{\beta}{2}\right)\cos\left(\frac{\gamma}{2}\right)\sin\left(\frac{\alpha}{2}\right) + \sin\left(\frac{\beta}{2}\right)\sin\left(\frac{\gamma}{2}\right)\cos\left(\frac{\alpha}{2}\right) \end{bmatrix} \quad (1)$$

In a virtual reality application, it is common practice to point back to the screen to be used as the world space by multiplying the quaternion. Then the orientation quaternion is rotated by the device screen orientation by multiplying the orientation quaternion by the screen orientation quaternion. Here the screen orientation could be denoted as $$q_s = \begin{bmatrix} q_w \\ q_x \\ q_y \\ q_z \end{bmatrix} = \begin{bmatrix} \cos\left(\frac{-\theta}{2}\right) \\ 0 \\ 0 \\ \sin\left(\frac{-\theta}{2}\right) \end{bmatrix} \quad (2)$$

wherein θ denotes the current screen orientation angle for the z axis based transformation quaternion (qs).

In the rendering process of the graphics application, which may be executed by a processor such as processor 340, the object world matrix may be achieved by composing the object position with the quaternion, including rotating using the quaternion and setting the scale and object. Then, the world matrix can be decomposed to a position, quaternion, and scale. The virtual camera direction may be achieved by applying the above mentioned decomposed quaternion to the vector (0, 0, −1)

$$tx = qw^*vx + qy^*vz - qz^*vy \quad (3)$$

$$ty = qw^*vy + qz^*vx - qx^*vz \quad (4)$$

$$tz = qw^*vz + qx^*vy - qy^*vx \quad (5)$$

$$tw = -qx^*vx - qy^*vy - qz^*vz \quad (6)$$

$$dir\_x\_value = tx^*qw + tw^*-qx + ty^*-qz - tz^*-qy \quad (7)$$

$$dir\_y\_value = ty^*qw + tw^*-qy + tz^*-qx - tx^*-qz \quad (8)$$

$$dir\_z\_value = tz^*qw + tw^*-qz + tx^*-qy - ty^*-qx \quad (9)$$

where dir_x_value denotes the x component of the virtual camera direction, dir_y_value denotes the y component of the virtual camera direction, dir_z_value denotes the z component of the virtual camera direction, respectively.

FIG. 6 illustrates an example frame structure according to this disclosure. As shown in FIG. 6, an MMT sub-protocol defines a frame structure that is used to frame the payload for transmission over binary WebSocket frames. The MMT sub-protocol frame consists of a frame header and frame payload. The frame header may be provided as WebSocket frame Extension Data, which shall be present and of which the size can be determined as 4+4*EXT_LENGTH bytes as given by the MMT sub-protocol frame header. The MMT sub-protocol frame header is defined as follows:

V: 2 bits: The version number of the MMT sub-protocol. The current version number may be set to '00'.

D: 1 bit: The data bit indicates if the content is data or control. If the data flag is set then the payload shall be the MMTP packet and CMD_CODE should be set to 0x1F.

CMD_CODE: 5 bits: Indicates the control command that is sent in this request/response. The command codes may include the following commands as defined in the Table 1 and Table 2 below.

TABLE 1

MMT WebSocket Sub-protocol Commands for FOV VR streaming

| Command Code | Value | Description |
| --- | --- | --- |
| Application | 6 | Application-specific command. The command may be registered by MPEG in Annex X. The application shall be identified by a JSON encoded parameter, "Application-Type". |

TABLE 2

The application-specific JSON parameters

| JSON parameter | JSON format | Description |
| --- | --- | --- |
| "Application-Type" "SupportQuery" | "Application-Type": "MPEG-VR-Feedback" "SupportQuery": {"TileTextureInfo":tile_texture_info} | The MMT sending entity sends the Application command with JSON parameter equal to SupportQuery to query whether or not the client supports MPEG-VR-Feedback. The query provides with the client about TileTextureInfo as defined follows. |
| "TileTextureInfo" | "TileTextureInfo":{"baseTextureEnabled":base_texture_enabled_flag, "baseTextureResolution": "base_texture_resolution", "EnhancedViewResolution": enhanced_view_resolution, "upActiveEnhancedTextureCounts": up_active_enhanced_texture_count, "enhanedTexturesCount": enhanced_textures_count, "enhancedTexturesCoordinates": | The MMT sending entity signals the texture information for the enhanced view and base view textures with TileTextureInfo JSON parameter, which is used to setup the shader function for rendering of tiles at the client. In case the base_texture_enabled_flag equal to true, a string value with hor_resolutionXver_resolution is provided for the |

TABLE 2-continued

The application-specific JSON parameters

| JSON parameter | JSON format | Description |
| --- | --- | --- |
|  | [enhanced_texture_coordincate0, enhanced_texture_coordincate1, . . . , enhanced_texture_coordincateN]} | baseTextureResolution. A string value with hor_resolutionXver_resolution is provided for the EnhancedViewResolution indicating the omnidirectional VR content resolution covering 360 degree content. upActiveEnhancedTextureCounts parameter is included to indicate the upper limit of the active enhanced texture counts for the enhanced view at any of a time instant in the FOV streaming. Next, the enhanedTexturesCount and enhancedTexturesCoordinates are included to signal the count of tiles of the enhanced view and the corresponding coordinates of the tile textures. |
| MMTAssetIDs | "MMTAssetID":{baseMmtAssetID: base_mmt_asset_id, "mmtAssetIDs": [enhanced_assset_id0, enhanced_asset_id1, . . . , Enhanced_asset_idN]} | The MMT sending entity provides the MMT asset ID for each texture of the enhanced view and base view. The order of the mmtAssetIDs should be identical to the order of the enhancedTexturesCoordinates. In other words, the enhanced_asset_id and enhanced_texture_coordincate for texture i shall be in the identical position in the arrays. If base_texture_enabled_flag equal to one in TileTextureInfo, baseMmtAssetID is included in the MMTAssetIDs. Otherwise, baseMmtAssetID is not included. |
| SupportReply | "SupportReply": support_status | The MMT receiving entity replies with the boolean support_status to the MMT sending entity. The value support_status equal to true denotes the client supporting of the MPEG-VR-Feedback and false denotes not supporting. |
| "VRCameraDirectionFeedback" | "VRCameraDirectionFeedback": {"dirx": dir_x_value, "diry": dir.y_value, "dirz": dir_z_value, "horizontalFov": horizontal_fov, "verticalFov": vertical_fov, "curPresentationTime": cur_presentation_time}. | The MMT VR FOV receiving entity feedbacks the camera direction information periodically or in case of FOV changing event to the MMT sending entity to inform about the current VR camera direction and its horizontal and vertical FOV, and the current presentation time. The camera direction information is represented as the three dimensional vectors, wherein the x, y z components are represented as dir_x_value, dir_y_value, dir_z_value. The horizontal and vertical FOV lengths are represented as horizontal_fov and vertical_fov. The current presentation time indicates the current playback time in millisecond. |
| NewMMTAssets | "NewMMTAssets": {"countMMTAssets": count_mmt_assets, "mmtPacketIDs": [mmt_asset_id1, mmt_asset_id2,..., mmt_asset_idN,]} | This command is sent from the server to the client to indicate MMT packets belonging to the new assets will be sent to the client from the server. Together with the command, the number of MMT assets and the current activate MMT packet IDs array are signaled from the server to the client, with count_mmt_assets and [mmt_asset_id1, mmt_asset_id2, .., mmt_asset_idN,], respectively. The mmt_asset_id shall be identical to MMT packet ID in the MMT packet for an identical asset. |

TABLE 2-continued

The application-specific JSON parameters

| JSON parameter | JSON format | Description |
| --- | --- | --- |
| ErrorMessage | "ErrorMessage": {"ErrorStatus": status_code, "Reason": "ErrorReason"} | In case the server does not support the "MPEG-VR-Feedback" application type, the server ignores the all the following JSON parameters and replies with the Error message including the error status and the reason. Error status 404 denotes the "MPEG-VR-Feedback" is not supported application type by the streaming sever, and the errorReason denotes the streaming message, e.g. "MPEG-VR-Feedback" is not supported application type". |

FIGS. 7A through 10 illustrate example operations of a server and UE according to this disclosure. FIGS. 7A through 10 will be discussed while making reference to server 200 of FIG. 2 and UE 300 of FIG. 3. FIGS. 7A through 10 merely provide one example of performing the embodiments described herein. One or more steps shown in FIGS. 7A through 10 may be removed, altered, or expanded without altering the scope of this disclosure.

Figure 7A:
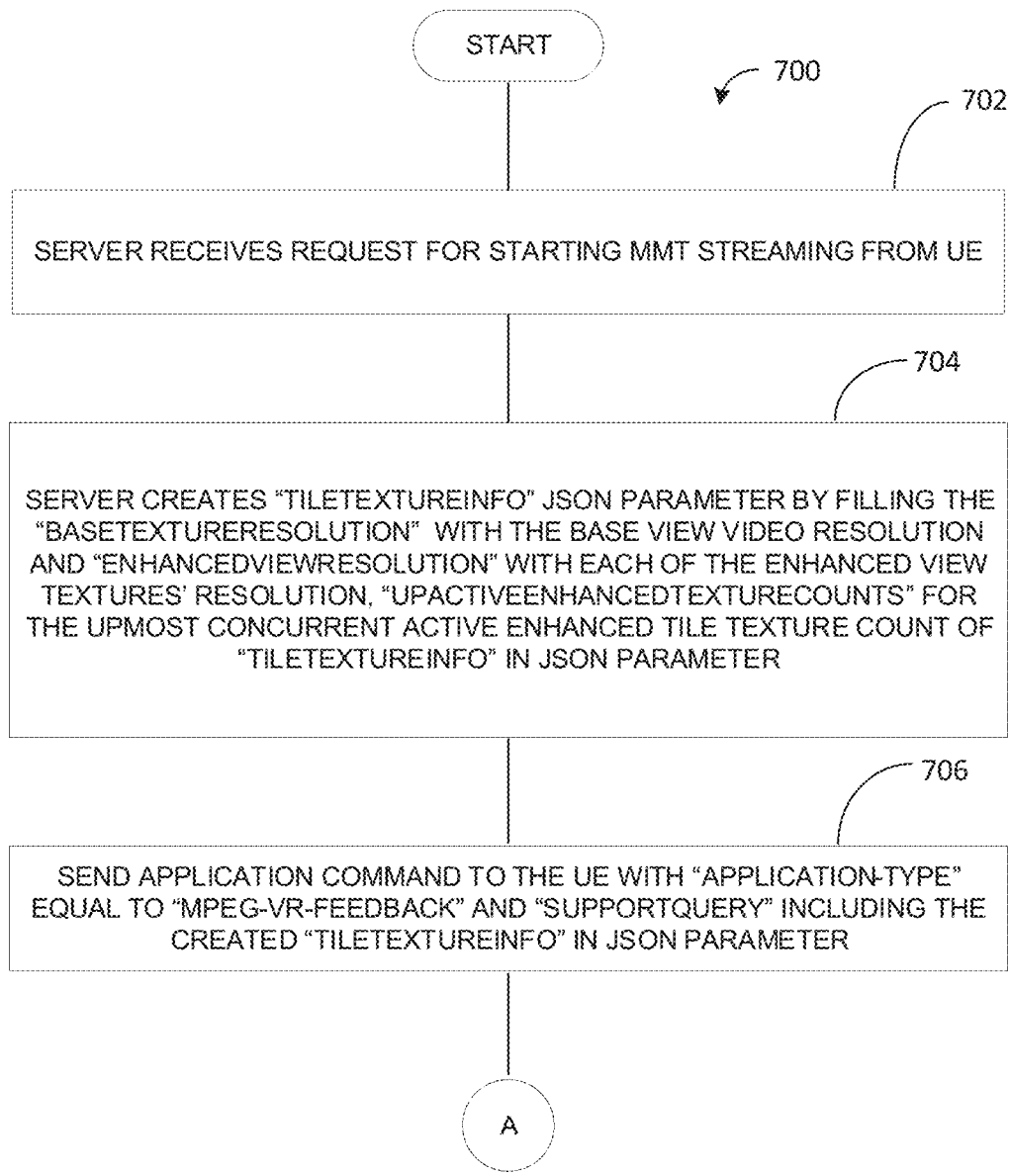
FIGS. 7A and 7B illustrate an example operation of a server according to this disclosure.
Figure 7B:
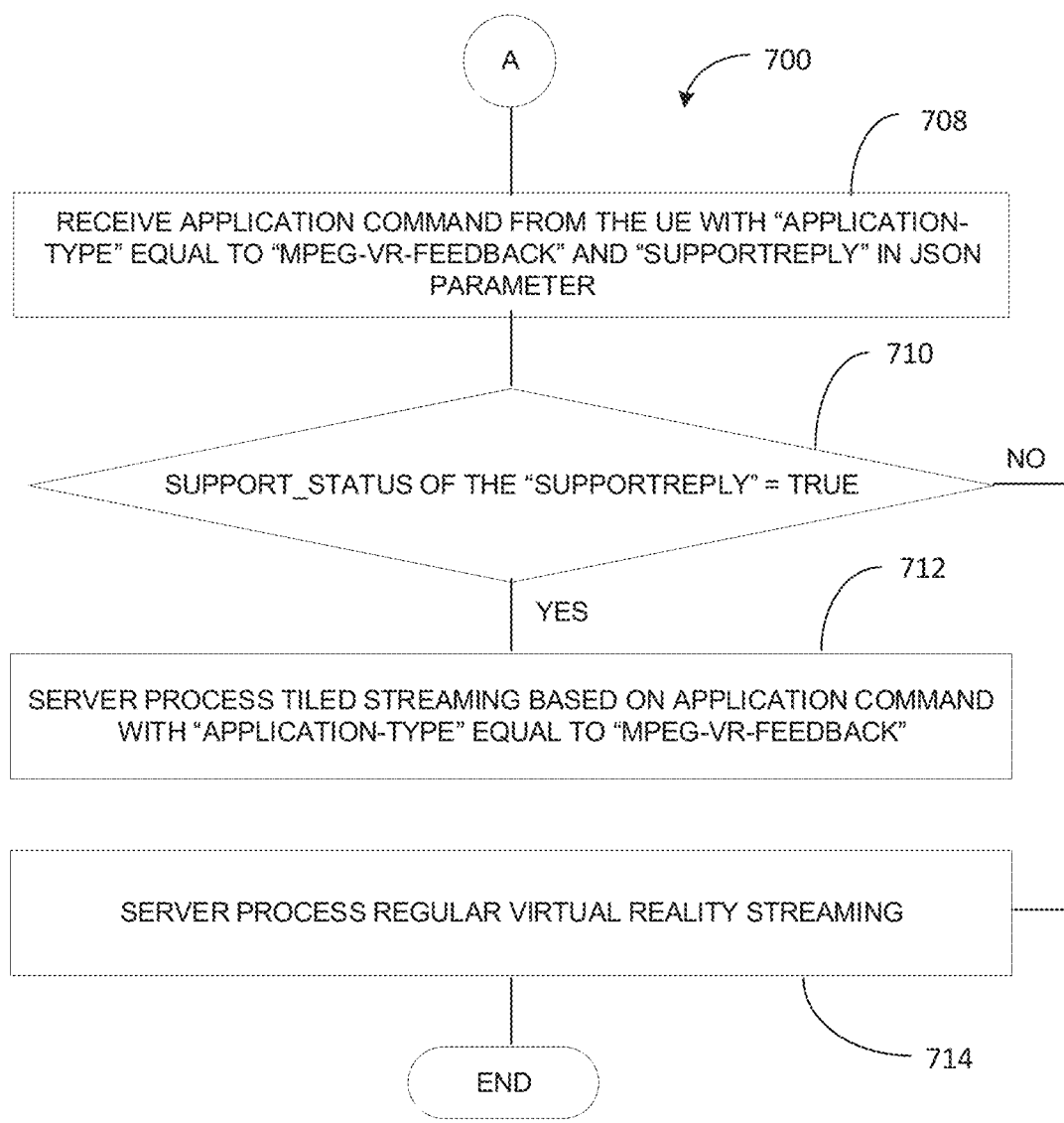

FIGS. 7A and 7B illustrate an example operation 700 for supporting FOV streaming. As shown in FIGS. 7A and 7B, in operation 702, the server 200 receives a request for starting a MMT streaming session from a UE 300. The UE provides commands such as "APPLICATION-TYPE" EQUAL TO "MPEG-VR-FEEDBACK" AND "SUPPORTREPLY" in JSON PARAMETER as shown in FIG. 6.

In operation 704 the server creates "TileTextureInfo" JSON parameter by filling the "baseTextureResolution" with the base view video resolution and "EnhancedViewResolution" with each of the enhanced view textures' resolution, "upActiveEnhancedTextureCounts" for the upmost concurrent active enhanced tile texture count of "TileTextureInfo" in JSON parameter. The EnhancedViewResolution corresponds to the initial FOV, such as FOV 502, while the baseTextureResolution would correspond to the remaining video outside of the FOV 502.

In operation 706, the server 200 queries whether or not the UE 300 supports the application command to the client with "Application-Type" equal to "MPEG-VR-Feedback". The server 200 sends an application command to the client with "Application-Type" equal to "MPEG-VR-Feedback" and "SupportQuery" including the created "TileTextureInfo" in JSON parameter.

In operation 708, the server 200 receives an application command from the UE 300 with "Application-Type" equal to "MPEG-VR-Feedback" and "SupportReply" in JSON parameter. In operation 710, If the support_status of the "SupportReply" is equal to true, then the server 200 processes the tiled MMT streaming based on an application command with "Application-Type" equal to "MPEG-VR-Feedback" in operation 712. Otherwise, if the support_status is equal to false, then the server 200 process regular MMT streaming on operation 714.

Figure 8:
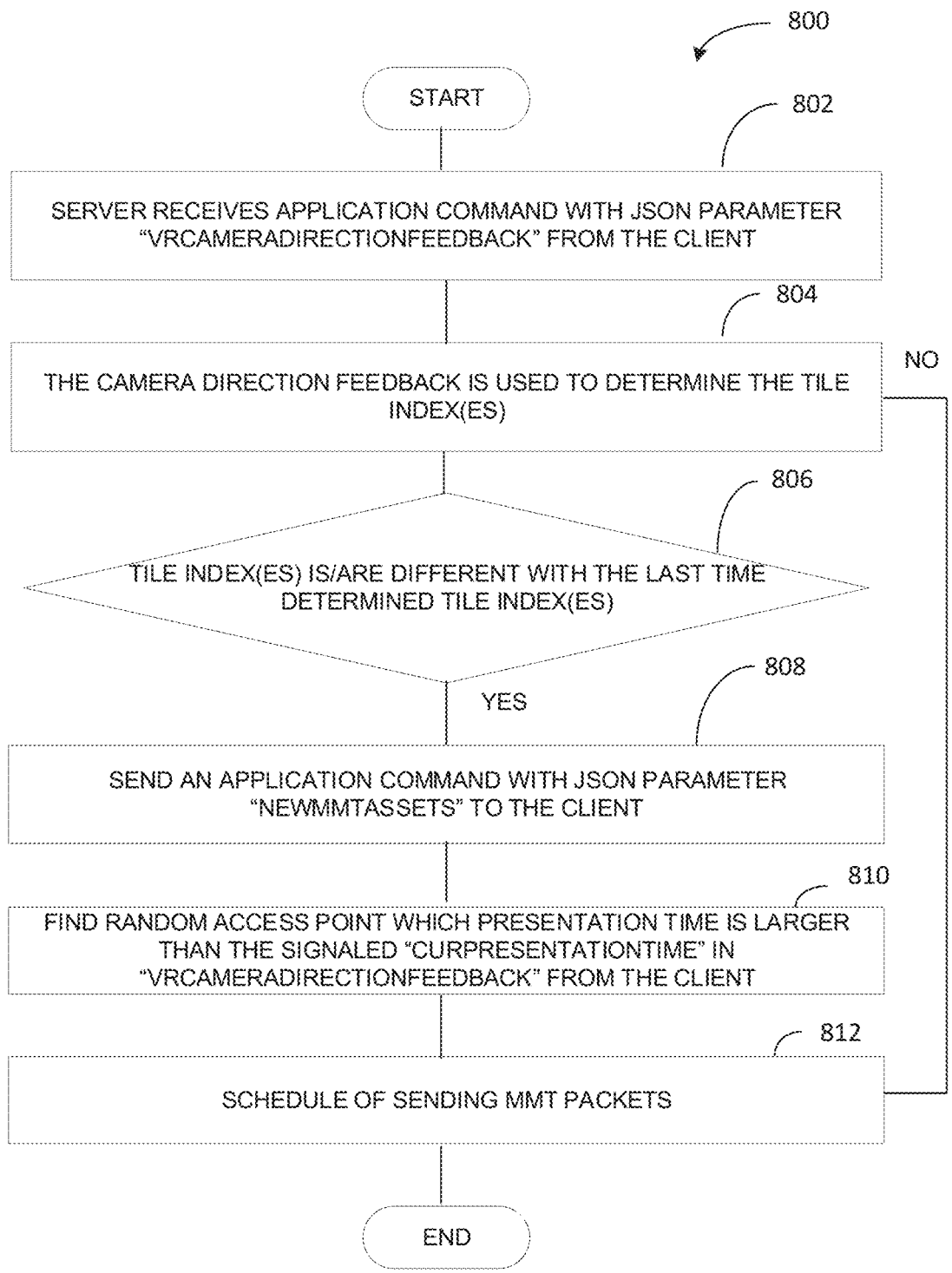
FIG. 8 illustrates an example operation of a server according to this disclosure.

FIG. 8 illustrates an example operation 800 operations of a server 200 for receiving and sending the Application command with "Application-Type" equal to "MPEG-VR-Feedback" with JSON parameters equal to "VRCameraDirectionFeedback" and "NewMMTAssets" according to this disclosure. As shown in FIG. 8, in operation 802, server 200 receives an application command with JSON parameter "VRCameraDirectionFeedback" from the UE 300. The camera direction feedback of UE 300 is used to determine the tile index(es) in operation 804.

In operation 806, the server 200 determines if the tile index(es) is/are different from the last time the tile index(es) were determined. If the tiles index(es) are different, then the server 200 sends an application command with JSON parameter "NewMMTAssets" to the UE 300 to inform the UE 300 that the server 200 will send new MMT assets for the specified tile index(es) and inform the new MMT asset IDs in operation 808.

In operation 810, the server 200 finds a Random access point where the presentation time is larger than the signaled "curPresentationTime" in "VRCameraDirectionFeedback" from the UE 300 and schedules sending MMT packets from the specified random access point to UE 300 in operation 812. In operation 806, if the server 200 determines if the tile index(es) is/are not different from the last time the tile index(es) were determined, the operation proceeds to operation 812 to continues sending MMT packets from the original tile.

Figure 9A:
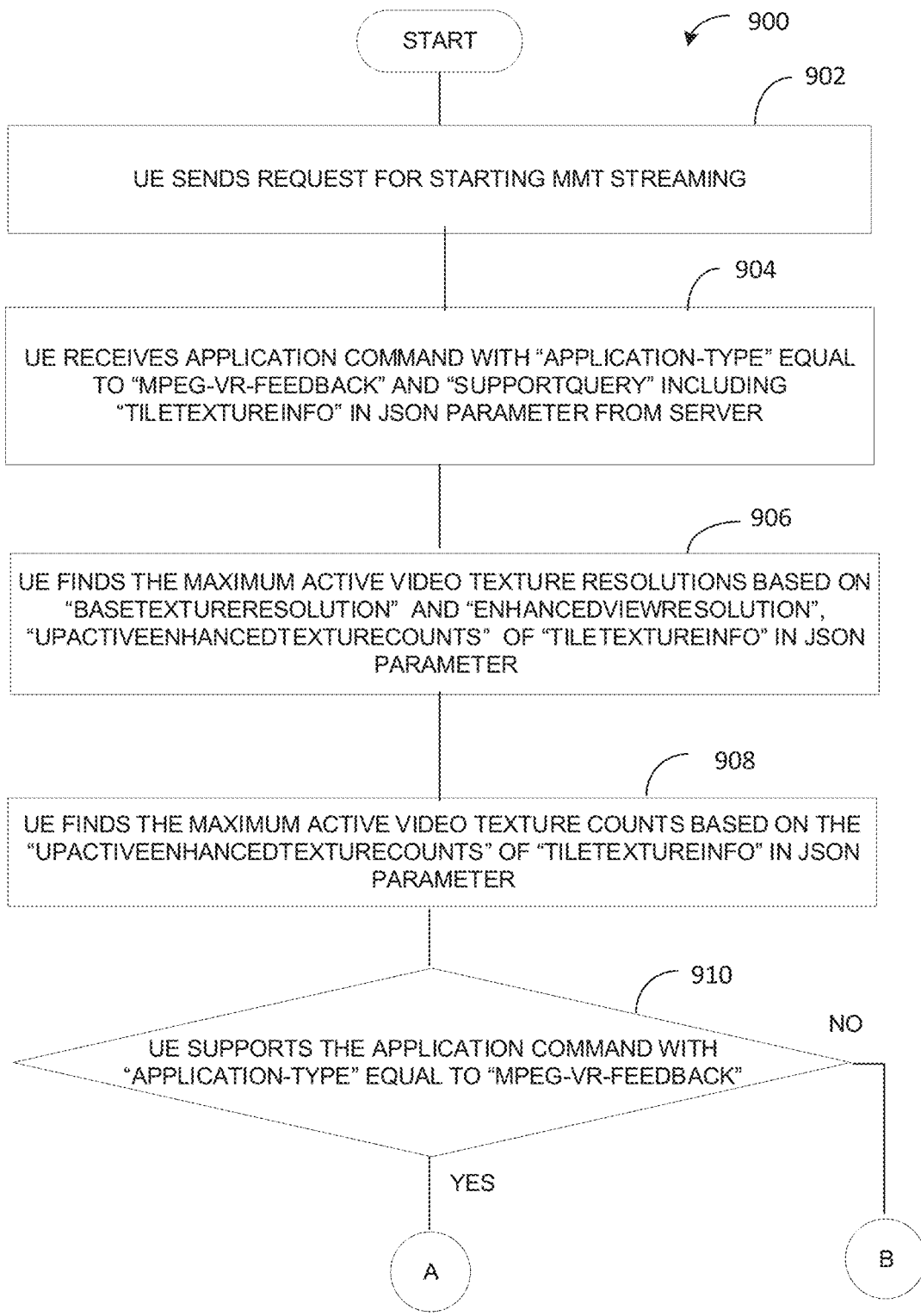
FIGS. 9A and 9B illustrate an example operation of a UE according to this disclosure.
Figure 9B:
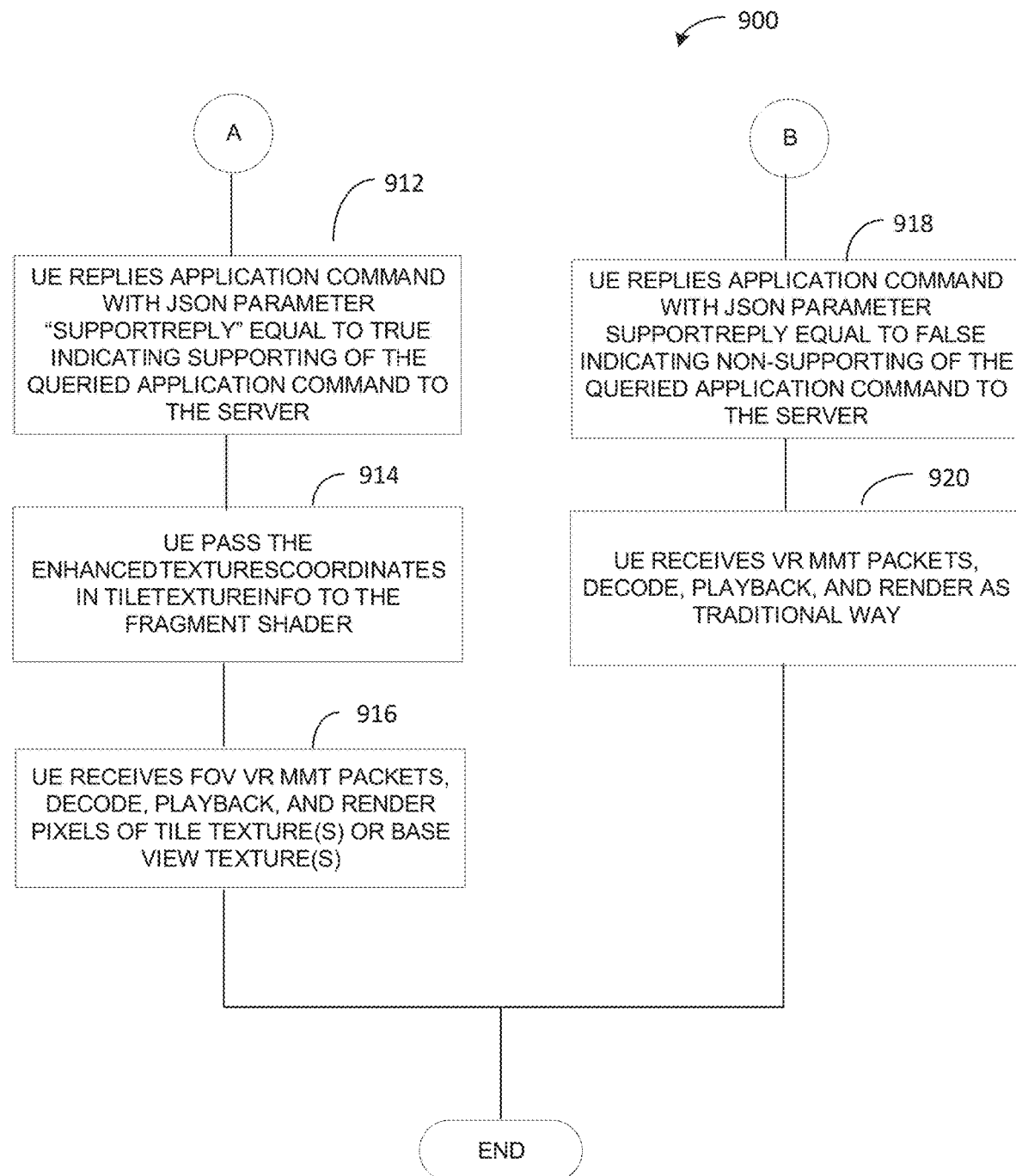

FIGS. 9A and 9B illustrate an example operation 900 of a UE for supporting FOV streaming. As shown in FIGS. 9A and 9B. In operation 902, the UE 300 sends a request for starting an MMT VR streaming. The UE 300 receives an Application command with "Application-Type" equal to "MPEG-VR-Feedback" and "SupportQuery" in JSON parameter from the server 200 in operation 904.

The UE 300 finds the maximum active video texture resolutions based on "baseTextureResolution" and EnhancedViewResolution, upActiveEnhancedTextureCounts, in "TileTextureInfo" included in the "SupportQuery" in operation 906. Then UE 300 finds the maximum active video texture counts based on the "upActiveEnhancedTextureCounts" of "TileTextureInfo" in the JSON parameter in operation 908.

Based on the maximum active video texture resolutions and maximum active video texture counts, the UE 300 decides whether the client could support the "MPEG-VR-Feedback" and the tiling based FOV streaming. In operation 910, if UE 300 supports the VR feedback, then the UE 300 replies Application command with JSON parameter "SupportReply" equal to true indicating supporting of the queried application command to the server 200 in operation 912. Then, the UE 300 passes the "enhancedTexturesCoordinates" in "TileTextureInfo" to a fragment shader, which may be implemented by processor 340, to setup the fragment shader in operation 914. In operation 916, UE 300 receives FOV VR MMT packets, decodes, playbacks, and renders the tile or base view texture(s).

If the UE 300 determines that the it does not support VR feedback, then the UE 300 replies Application command with JSON parameter "SupportReply" equal to false indicating non-supporting of the queried Application command to the server in operation 918. Then the UE 300 receives VR MMT packets, decodes, playbacks, and renders the VR MMT packets in a traditional way.

Figure 10:
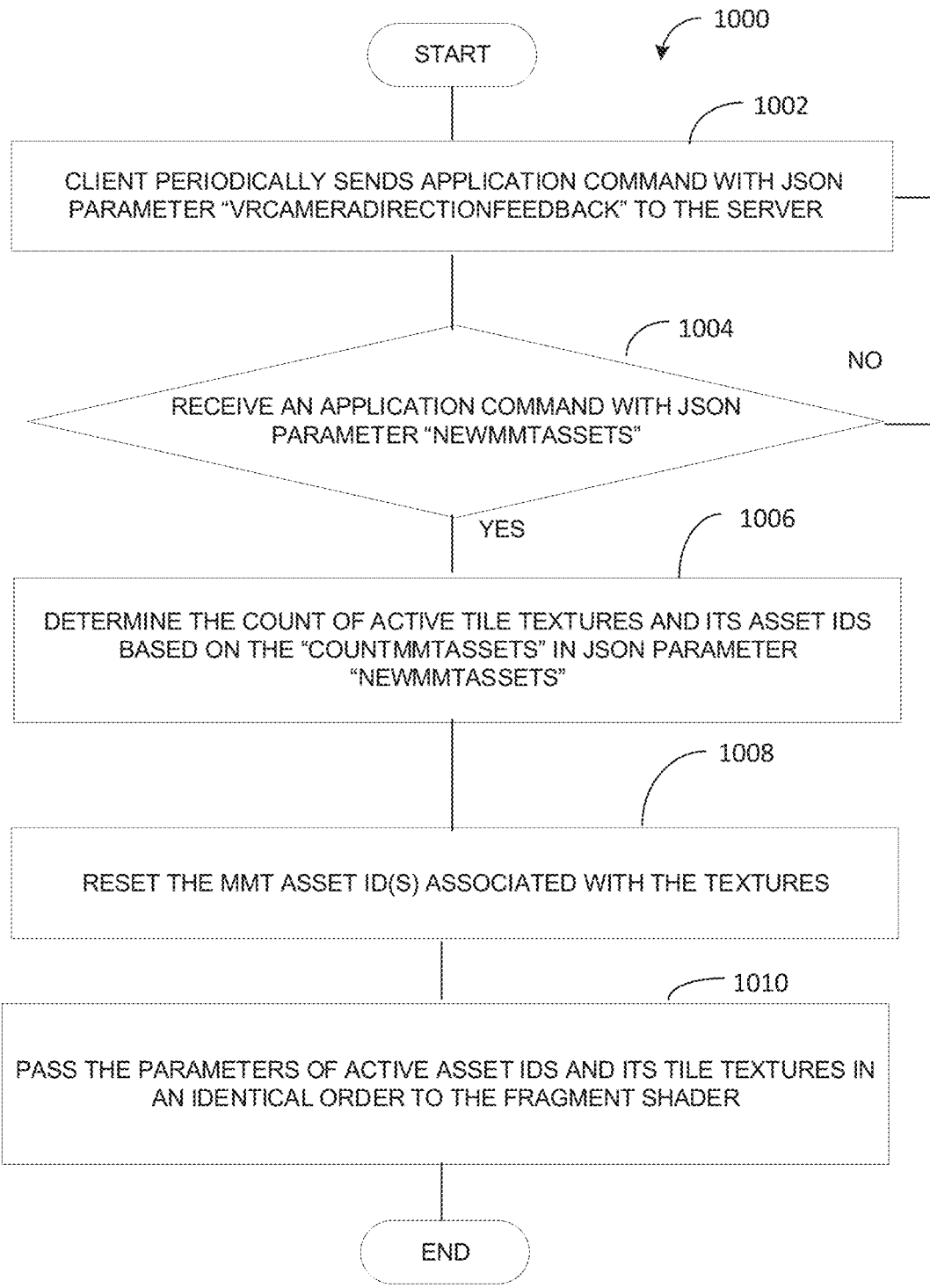
FIG. 10 illustrates an example operation of a UE according to this disclosure.

FIG. 10 illustrates an example operation 1000 of a UE 300 operation of sending and receiving an application command with "Application-Type" equal to "MPEG-VR-Feedback" with JSON parameters equal to "VRCameraDirectionFeedback" and "NewMMTAssets. In operation 1002, the UE 300 periodically sends an application command with JSON parameter "VRCameraDirectionFeedback" to the server 200. When UE 300 receives an Application command with JSON parameter "NewMMTAssets" in operation 1004, the UE 300 determines the count of active tile textures and its asset IDs based on the "countMMTAssets" in JSON parameter "NewMMTAssets" in operation 1006.

In operation 1008, the UE 300 resets the MMT Asset ID(s) associated with the textures and passes the parameters of active asset IDs and its tile textures in an identical order to the fragment shader in operation 1008. The fragment shader uses the parameters of active asset ID(s) and its tile texture(s), correspondingly, to decide which tile texture pixels to be rendered in operation 1010.

In the embodiments described above, the rendering process performed by the UE 300 firstly checks whether or not the current pixel to be rendered is in the scope of the video texture range of the high resolution partition in the Equirectangular (ERP) coordinate, which can be obtained by using the active packet ID(s) which is sent from the server 200 to the UE 300 each time the server 200 changes the Assets. The information describing the packaging of the high resolution partition and low resolution ERP is needed. If the result of the check is true, i.e. the coordinate of the current pixel to be rendered in the ERP projection coordinate is in the scope of the video texture range of the high resolution partition of the currently received and being played asset, then the pixel of the high resolution omnidirectional video partition is rendered. The coordinate of the high resolution partition could be determined by mapping the coordinate of the current pixel of the ERP to the corresponding position in ERP partition.

If the result of the check is false, i.e. the coordinate of the current pixel to be rendered is not in the scope of the high resolution partition of currently received and being played asset, then the low resolution part of the video texture will be rendered, alternatively. The coordinate of the low resolution partition could be determined by mapping the coordinate of the current pixel of the ERP to the corresponding position in low resolution ERP. The described process can be processed with a shader function of WebGL. The WebGL provides a shader functionality including fragment shader and vertex shader, which takes the advantages of the parallel processing. A uniform parameter can be passed to the shaders to indicate the Asset ID of the currently being received and played high resolution video partition at the FOV VR streaming client. Based on the Asset ID the shader, the shader could dynamically figure out the video texture corresponds to which Asset; hence the above described rendering process could be processed successfully.

Figure 11:
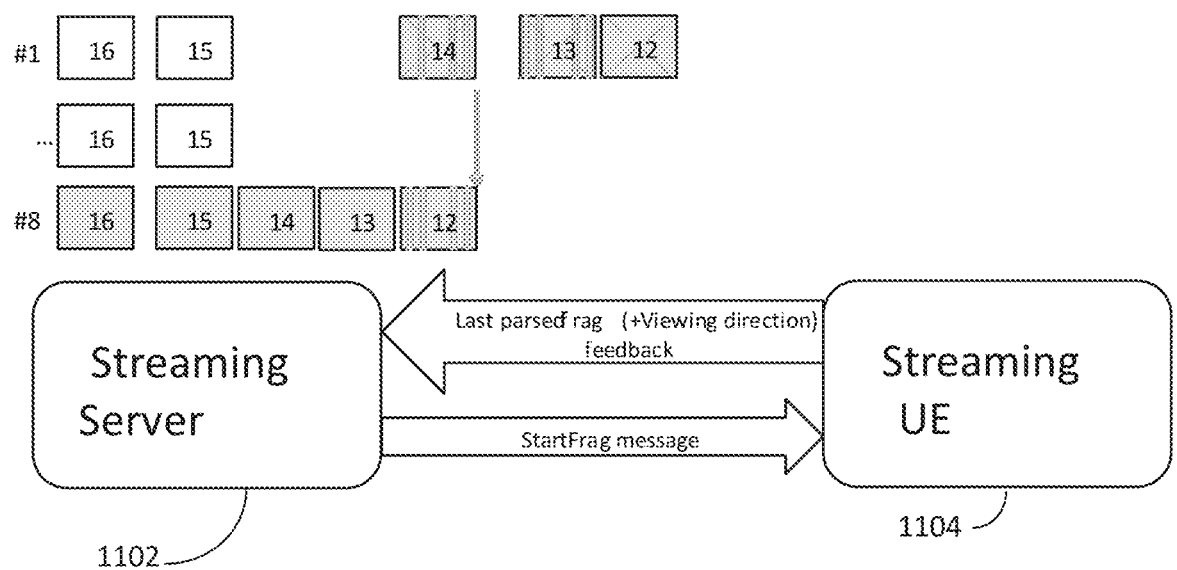
FIG. 11 illustrates an example of time overlapping for virtual reality streaming according to this disclosure.

FIG. 11 illustrates an example of time overlapping for MMT streaming of VR content according to this disclosure.

During an MMT streaming session, in order to reduce the amount of data transmitted during the streaming session, the server 1102 transmits a high resolution portion of the virtual reality environment that corresponds to the UE 1104 FOV, e.g., FOV 502 of FIG. 5, and a low resolution portion of the virtual reality environment outside of the UE 1104 FOV. When a user moves the UE 1104 such the FOV changes, e.g., to FOV 504 of FIG. 5, the UE 1104 will render a low resolution version of the virtual reality environment that corresponds to FOV 504 until server 1102 provides new assets. Because the UE 1104 may have already started rendering the original assets, the UE 1104 provides a last parsed fragment information to the server 1102. The UE 1104 may use the following syntax to provide the last parsed fragment:

```
Application ( ){
    application_type
    if (application_type == xxx)
    {
        application_subtype
        If (application_subtype == 5) {
            last_parsed_packet_id
            last_parsed_MPU_sn
            last_parsed_frag_sn
        }
    }
}
``` where application_type defines the application-type and application-subtype defines application-type. The last_parsed_packet_id defines the last parsed packet ID of the MPU of the last parsed fragment whose sequence number is defined in last_parsed_frag_sn. The last_parsed_MPU_sn defines the last parsed MPU sequence number of the last parsed fragment whose sequence number is defined in last_parsed_frag_sn. The last_parsed_frag_sn defines the last parsed fragment sequence number. The server 1102 may then deliver a fragment in an overlapped manner based on the last parsed fragment information from UE 300 and an indication of when to start the fragment to the UE 1104.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A server for streaming content, the server comprising:
   a communication interface configured to communicate with a user equipment (UE); and
   at least one processor configured to:
      determine whether the UE supports viewing direction feedback, after receiving, from the UE, an indication that the UE supports viewing direction feedback, generate a first portion of the content, at a first resolution, corresponding to a first field of view of the UE and a remaining portion of the content, at a second resolution, wherein the first resolution is higher than the second resolution, and control the communication interface to transmit the first portion and the remaining portion of the content to the UE.

2. The server of claim 1, wherein the content includes a plurality of tiles and the first portion of the content includes a first set of tiles from the plurality of tiles corresponding the first field of view.

3. The server of claim 2, wherein the processor is configured to:

receive a second indication indicating a fragment that was last parsed by the UE and a second field of view from the UE; and generate a second portion of the content, at the first resolution, based on the second field of view and the fragment, the second portion of the content includes a second set of tiles from the plurality of tiles.

4. The server of claim 3, wherein to generate the second portion of the content the processor is configured to:

compare the first set of tiles among the plurality of tiles corresponding to the first field of view and the second set of tiles corresponding to the second field of view.

5. The server of claim 4, wherein:

when the first set of tiles is the same as the second set of tiles, the communication interface is configured to transmit the first portion of the content, and when the first set of tiles is different from the second set of tiles, the communication interface is configured to transmit the second portion of the content.

6. The server of claim 3, wherein the second indication indicates a starting point for the second portion of the content.

7. The server of claim 6, wherein the second indication is a start time.

8. The server of claim 6, wherein the second indication is at least one of a packet, a media processing unit, or the fragment.

9. A method performed by a server for streaming content, the method comprising:

determining whether a user equipment (UE) supports viewing direction feedback;

after receiving, from the UE, an indication that the UE supports viewing direction feedback; generating a first portion of the content, at a first resolution, corresponding to a first field of view of the UE a remaining portion of the content, at a second resolution, wherein the first resolution is higher than the second resolution; and transmitting the first portion and the remaining portion of the content to the UE.

10. The method of claim 9, wherein the content includes a plurality of tiles and the first portion of the content includes a first set of tiles from the plurality of tiles corresponding the first field of view.

11. The method of claim 10, further comprising:

receiving a second indication indicating a fragment that was last parsed by the UE and a second field of view from the UE; and generating a second portion of the content, at the first resolution, based on the second field of view and the fragment, the second portion of the content includes a second set of tiles from the plurality of tiles.

12. The method of claim 11, wherein generating the second portion of the content based on the second field of view comprises comparing the first set of tiles among the plurality of tiles corresponding to the first field of view and the second set of tiles corresponding to the second field of view.

13. The method of claim 12, the method further comprising:

when the first set of tiles is the same as the second set of tiles, transmitting the first portion of the content, and when the first set of tiles is different from the second set of tiles, transmitting the second portion of the content.

14. The method of claim 11, wherein the second indication indicates a starting point for the second portion of the content.

15. The method of claim 14 wherein the second indication is a start time.

16. The method of claim 14, wherein the second indication is at least one of a packet, a media processing unit, or the fragment.

17. A user equipment (UE) for rendering content, the UE comprising:

a communication interface configured to receive first portion of the content, at a first resolution and a remaining portion of the content, at a second resolution, from a server, wherein the first resolution is higher than the second resolution;

a sensor configured to detect a change in orientation of the UE; and a processor coupled to the communication interface and the sensor, the processor configured to:

after detecting the change in the orientation of the UE, render a portion of the remaining portion of the content corresponding to the orientation of the UE, generate an indication, the indication is configured to provide a starting point for new content;

control the communication interface to transmit the orientation of the UE and the indication to the server; and receive, via the communication interface, at least one tile of the new content, at the first resolution, based on the orientation of the UE and the indication.

18. The UE of claim 17, wherein the orientation of the UE includes an x-coordinate vector, a y-coordinate vector, and a z-coordinate vector.

19. The UE of claim 17, wherein the indication is based on a last parsed portion of the content that is rendered by the processor before the sensor determines the change in the orientation of the UE.

20. The UE of claim 17, wherein the indication is at least one of a packet, a media processing unit, or a fragment.

* * * * *